(12) United States Patent
Zinn et al.

(10) Patent No.: US 7,274,933 B2
(45) Date of Patent: Sep. 25, 2007

(54) HOME NETWORK NAME DISPLAYING METHODS AND APPARATUS FOR MULTIPLE HOME NETWORKS

(75) Inventors: Ronald Scotte Zinn, Waterloo (CA); Catherine M. Phillips, Waterloo (CA); Noushad Naqvi, Waterloo (CA); Ingo W. Weigele, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 160 days.

(21) Appl. No.: 10/932,899

(22) Filed: Sep. 2, 2004

(65) Prior Publication Data

US 2005/0113088 A1    May 26, 2005

(30) Foreign Application Priority Data

Sep. 3, 2003    (EP)    .................... 03255483

(51) Int. Cl.
    *H04Q 7/00*    (2006.01)
(52) U.S. Cl. ................. 455/435.2; 455/566; 455/432.1
(58) Field of Classification Search ............ 455/435.2, 455/432.1, 432.2, 518, 31.1; 713/1
    See application file for complete search history.

(56) References Cited

U.S. PATENT DOCUMENTS

| | | | |
|---|---|---|---|
| 6,195,532 B1* | 2/2001 | Bamburak et al. ......... 340/7.42 |
| 2001/0001875 A1* | 5/2001 | Hirsch ............................ 713/1 |
| 2002/0111180 A1* | 8/2002 | Hogan et al. ............... 455/518 |

FOREIGN PATENT DOCUMENTS

WO    WO98 58505 A    12/1998

OTHER PUBLICATIONS

Search Report And Opinion For EPO # 02355483.4, Feb. 20, 2004.

* cited by examiner

*Primary Examiner*—Lester G. Kincaid
*Assistant Examiner*—Charles Shedrick
(74) *Attorney, Agent, or Firm*—John J. Oskorep, Esq.

(57) ABSTRACT

Home network name displaying methods and apparatus for multiple home networks are disclosed. A mobile station scans to receive a plurality of Mobile Country Code (MCC) and Mobile Network Code (MNC) pairs corresponding to a plurality of communication networks within a coverage area. The mobile station selects and registers with a communication network associated with one of the received MCC and MNC pairs for communication. After the network is selected, the received MCC and MNC pair is compared with a plurality of home network MCC and MNC pairs which are associated with a single home network display name. Based on identifying a match between the received MCC and MNC pair and any one of the home network MCC and MNC pairs, the home network display name is visually displayed in a display of the mobile station. If no match exists, an alternate name is selected for display. The plurality of home network MCC and MNC pairs may be stored in memory of the mobile station or, alternatively, on a Subscriber Identify Module (SIM). Advantageously, a single home network name is displayed when a network associated with any of the home network MCC and MNC pairs is selected for communication.

19 Claims, 5 Drawing Sheets

FIG. 1
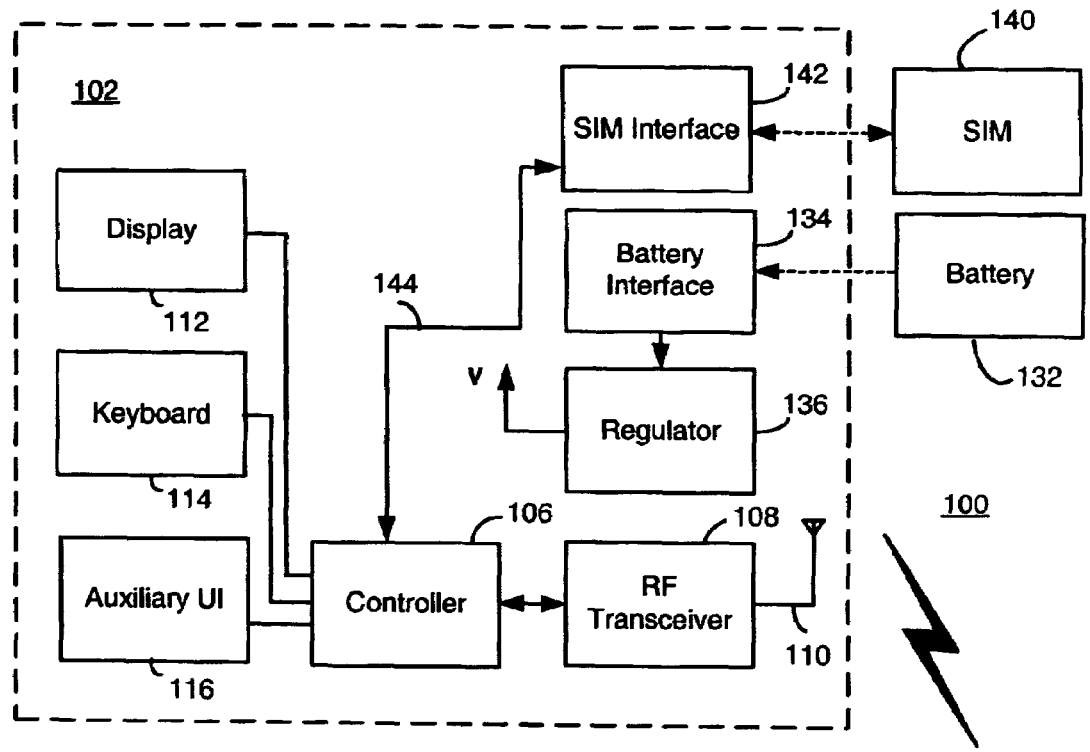
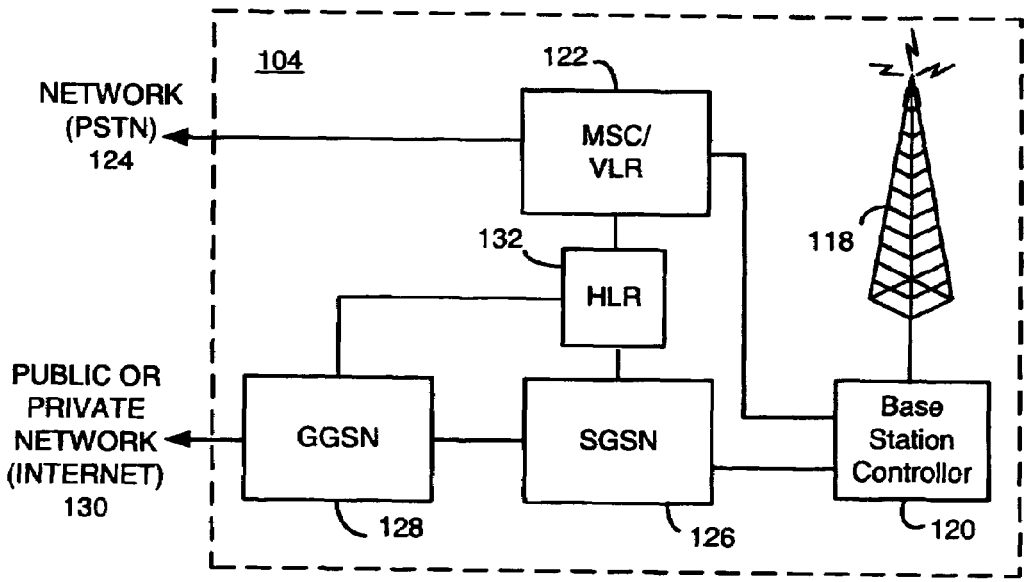

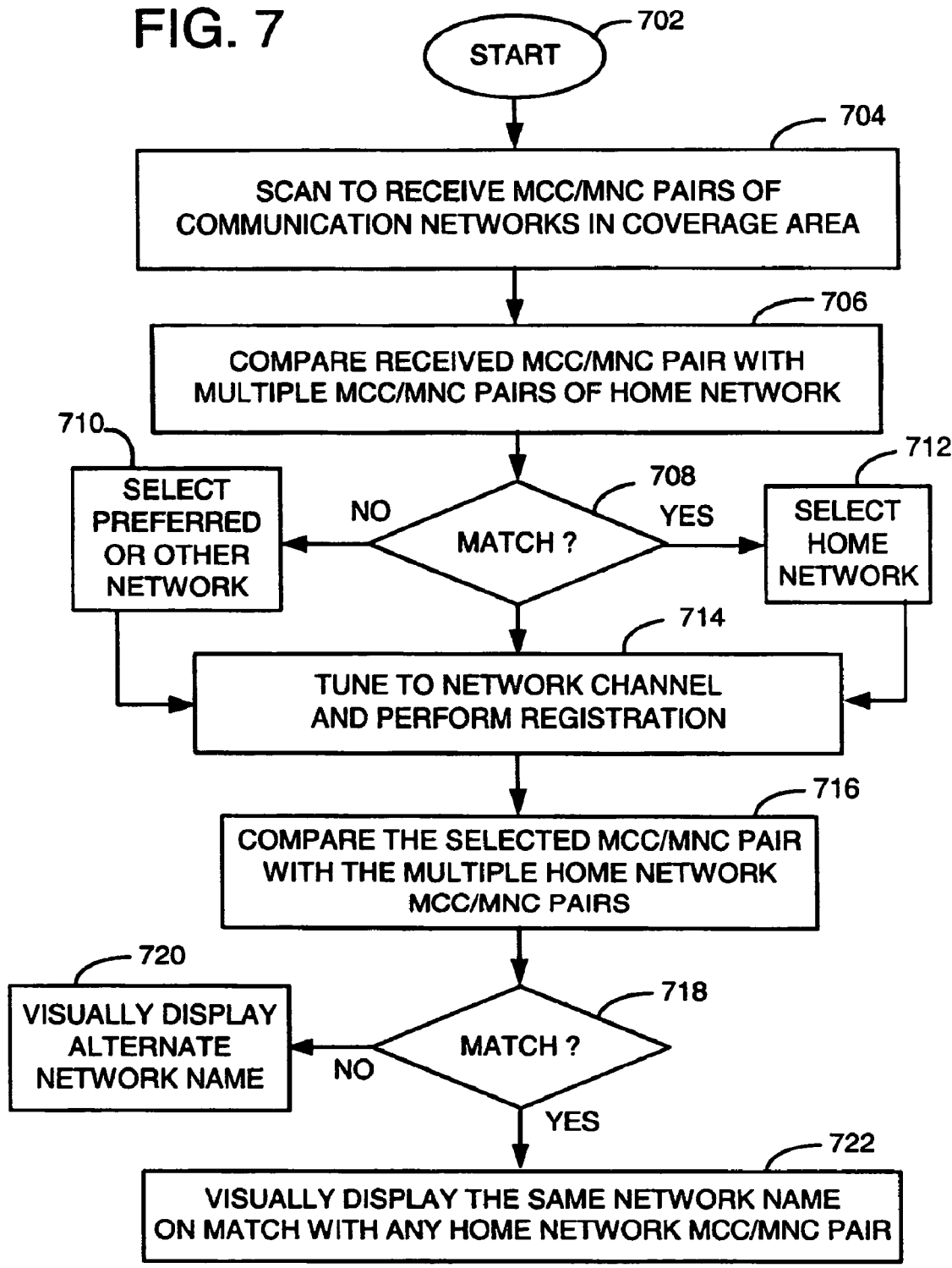

HOME NETWORK NAME DISPLAYING METHODS AND APPARATUS FOR MULTIPLE HOME NETWORKS

CROSS-REFERENCE TO RELATED APPLICATION

This application claims priority to European Patent Application No. 03255483.4 entitled "Home Network Name Displaying Methods And Apparatus For Multiple Home Networks" having a filing date of 3 Sep. 2003, which is hereby incorporated by reference herein.

BACKGROUND

1. Field of the Technology

The present application relates generally to mobile stations and home network name displaying methods employed thereby.

2. Description of the Related Art

Wireless communication devices, such as mobile stations, have the ability to communicate with other devices (e.g. telephones, servers, personal computers (PCs), etc.) through wireless communication networks. A wireless communication network includes a plurality of base stations, each of which provides near-exclusive communication coverage within a given geographic area. However, more than one wireless network is typically available in many, if not most, geographic regions in a competing fashion. Typically, an end user contracts with and pays to receive communication services exclusively from a single "service provider" for a limited period of time (e.g. one year).

Although different networks are available, a mobile station automatically selects and registers with its home communication network (i.e. the network of the contracted service provider) for operation. Typically, the mobile station receives a Mobile Country Code (MCC) and a Mobile Network Code (MNC) from each network and operates with a preference towards choosing that network having the MCC/MNC pair uniquely associated with the home network. The MCC/MNC pair of the home network is stored on a Subscriber Identify Module (SIM) in a home public land mobile network (HPLMN) file. Other networks are stored in a prioritized fashion in a "preferred" PLMN list on the SIM. After selecting and registering with a particular network (e.g. the home network), the mobile station retrieves and displays a service provider name (e.g. "T-Mobile" or "AT&T Wireless") from the SIM which corresponds to the unique MCC and MNC combination of the selected network. This name may be obtained and displayed in accordance with what is known as an "Operator Named String" (ONS) procedure.

Although exclusive service agreements typically exist between the subscriber and the home network, otherwise competing wireless networks have established relationships whereby mobile stations can receive services through the other's network when necessary or desired. When a mobile station is located in a geographic region where service provider has not established any network infrastructure, for example, the mobile station may receive services and communicate through a different network associated with an MCC/MNC pair different from that of the home network. In a competitive network relationship, the subscriber is likely to incur additional service charges (e.g. "roaming" charges) and the name of the competitor's network service may be displayed in the visual display.

In a more cooperative network relationship, the subscriber might incur only standard charges (i.e. no roaming charges) using the alternative network. Per the ONS naming procedure, however, a service provider name different from that of the home network is displayed on the mobile station. This may be confusing to a subscriber who may believe that, for example, roaming charges are being incurred due to use of the alternative network when in fact they are not. Fortunately, there has been a recent shift to provide an alternative naming technique referred to as "Enhanced Operator Named String" (EONS) procedure. EONS is described in, for example, 3GPP 51.001 Specifications of the SIM-ME Interface R4 (v4.2.0 or later). One purpose of EONS is to reduce the naming confusion created in scenarios like the one described above. In particular, instead of displaying a name that is different from that of the home network in the above-scenario, the same or substantially similar "home network" name may be displayed even though a different network is actually being used. Subscribers often prefer such transparency and simplification of operation and desire to understand when additional service charges may be incurred.

Another situation has been encountered where the service provider becomes the new owner of one or more networks which have MCC/MNC pairs different from that of the primary home network's. A mobile station might be provided with multiple MCC/MNC pairs corresponding to all of these "home" networks, and operate to preferentially select and register with these networks over others. However, the name displayed on the mobile station may not correspond to the home network if the selected network has a different MCC/MNC pair from that of the primary home network's. If steps were taken to provide the mobile station with special home network name displaying capabilities, compatibility issues may arise between previous, current, and future versions mobile stations and SIMs.

Accordingly, there is a resulting need for improved home network name displaying methods and apparatus for multiple home networks.

SUMMARY

Home network name displaying methods and apparatus for multiple home networks are described herein. A mobile station scans to receive a plurality of Mobile Country Code (MCC) and Mobile Network Code (MNC) pairs corresponding to a plurality of communication networks within a coverage area. The mobile station selects and registers with a communication network associated with one of the received MCC and MNC pairs for communication. After the network is selected, the received MCC and MNC pair is compared with a plurality of home network MCC and MNC pairs which are associated with a single home network display name. Based on identifying a match between the received MCC and MNC pair and any one of the home network MCC and MNC pairs, the home network display name is visually displayed in a display of the mobile station. If no match exists, an alternate name is selected for display. The plurality of home network MCC and MNC pairs may be stored in memory of the mobile station or, alternatively, on a Subscriber Identify Module (SIM). Advantageously, a single home network name is displayed when a network associated with any of the home network MCC and MNC pairs is selected for communication. Preferably, a Location Area Code (LAC) is also utilized along with the MCC and MNC pairs for these purposes.

BRIEF DESCRIPTION OF THE DRAWINGS

Embodiments of present invention will now be described by way of example with reference to attached figures, wherein:

FIG. 1 is a block diagram of a communication system which includes a mobile station for communicating in a wireless communication network which may be its home communication network;

FIG. 7 is a flowchart for describing a home network name displaying method for multiple home networks.

DETAILED DESCRIPTION OF THE PREFERRED EMBODIMENTS

Figure 2:
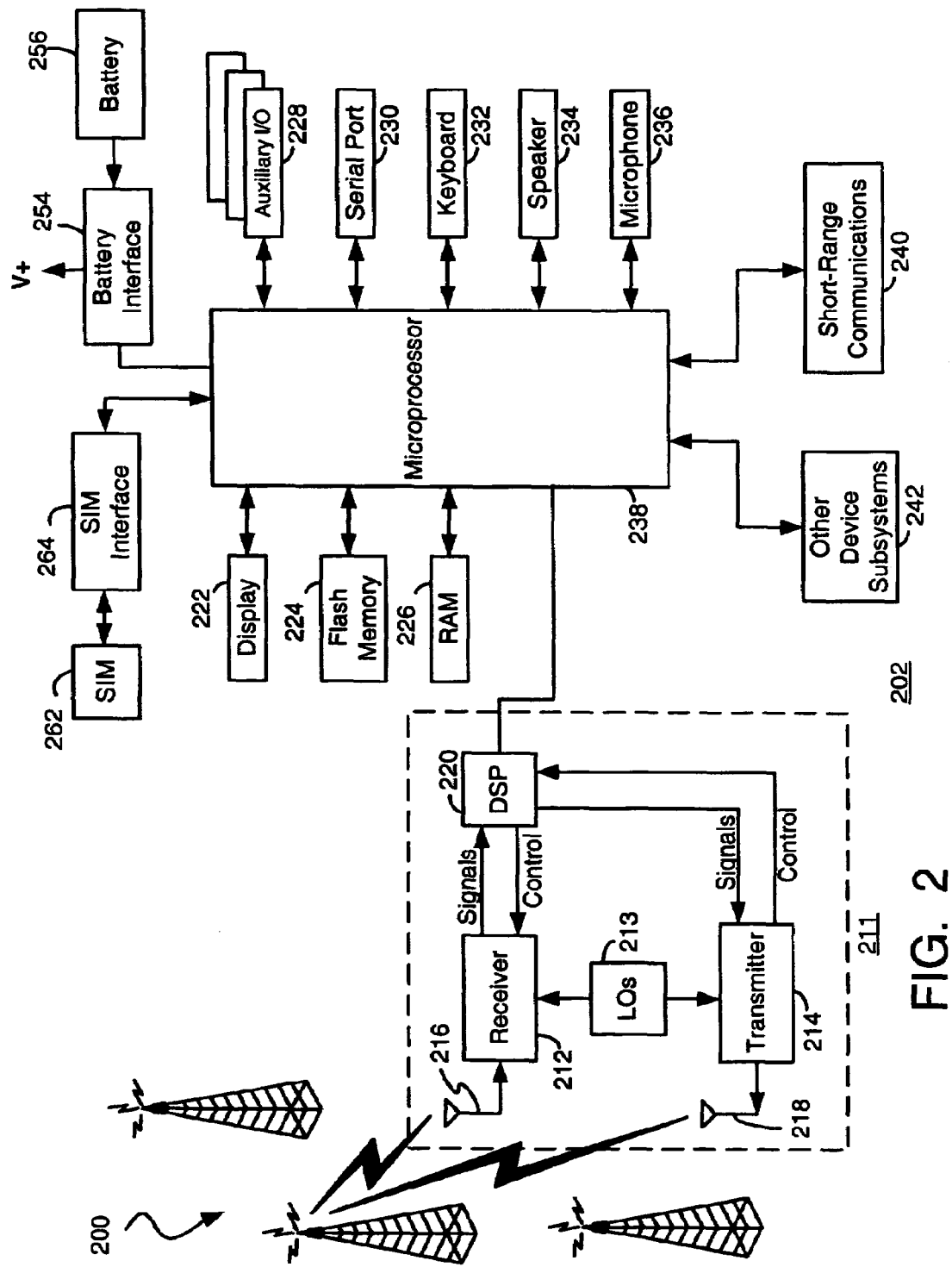
FIG. 2 is a more detailed example of a mobile station for use in the wireless communication network.

Home network name displaying methods and apparatus for multiple home networks are described herein. A mobile station scans to receive a plurality of Mobile Country Code (MCC) and Mobile Network Code (MNC) pairs corresponding to a plurality of communication networks within a coverage area. The mobile station selects a communication network associated with one of the received MCC and MNC pairs for communication. After the network is selected, the received MCC and MNC pair is compared with a plurality of home network MCC and MNC pairs which are associated with a single home network display name. Based on identifying a match between the received MCC and MNC pair and any one of the home network MCC and MNC pairs, the home network display name is visually displayed in a display of the mobile station. If no match exists, an alternate name is selected for display. The plurality of home network MCC and MNC pairs may be stored in memory of the mobile station or, alternatively, on a Subscriber Identify Module (SIM). Advantageously, a single home network name is displayed when a network associated with any of the home network MCC and MNC pairs is selected for communication.

FIG. 1 is a block diagram of a communication system 100 which includes a wireless communication device 102 which communicates through a wireless communication network 104. In the preferred embodiment, wireless communication device 102 is a mobile station and therefore this term is used throughout this text. Mobile station 102 preferably includes a visual display 112, a keyboard 114, and perhaps one or more auxiliary user interfaces (UI) 116, each of which are coupled to a controller 106. Controller 106 is also coupled to radio frequency (RF) transceiver circuitry 108 and an antenna 110.

In most modern communication devices, controller 106 is embodied as a central processing unit (CPU) which runs operating system software in a memory component (not shown). Controller 106 will normally control overall operation of mobile station 102, whereas signal processing operations associated with communication functions are typically performed in RF transceiver circuitry 108. Controller 106 interfaces with device display 112 to display received information, stored information, user inputs, and the like. Keyboard 114, which may be a telephone type keypad or full alphanumeric keyboard, is normally provided for entering data for storage in mobile station 102, information for transmission to network 104, a telephone number to place a telephone call, commands to be executed on mobile station 102, and possibly other or different user inputs.

Mobile station 102 sends communication signals to and receives communication signals from network 104 over a wireless link via antenna 110. RF transceiver circuitry 108 performs functions similar to those of base station 120, including for example modulation/demodulation and possibly encoding/decoding and encryption/decryption. It is also contemplated that RF transceiver circuitry 108 may perform certain functions in addition to those performed by base station 120. It will be apparent to those skilled in art that RF transceiver circuitry 108 will be adapted to particular wireless network or networks in which mobile station 102 is intended to operate.

Mobile station 102 includes a battery interface 134 for receiving one or more rechargeable batteries 132. Battery 132 provides electrical power to (most if not all) electrical circuitry in mobile station 102, and battery interface 132 provides for a mechanical and electrical connection for battery 132. Battery interface 132 is coupled to a regulator 136 which regulates power for the device. When mobile station 102 is fully operational, an RF transmitter of RF transceiver circuitry 108 is typically keyed or turned on only when it is sending to network, and is otherwise turned off to conserve resources. Such intermittent operation of transmitter has a dramatic effect on power consumption of mobile station 102. Similarly, an RF receiver of RF transceiver circuitry 108 is typically periodically turned off to conserve power until it is needed to receive signals or information (if at all) during designated time periods.

Mobile station 102 may consist of a single unit, such as a data communication device, a cellular telephone, a multiple-function communication device with data and voice communication capabilities, a personal digital assistant (PDA) enabled for wireless communication, or a computer incorporating an internal modem. Alternatively, mobile station 102 may be a multiple-module unit comprising a plurality of separate components, including but in no way limited to a computer or other device connected to a wireless modem. In particular, for example, in the mobile station block diagram of FIG. 1, RF transceiver circuitry 108 and antenna 110 may be implemented as a radio modem unit that may be inserted into a port on a laptop computer. In this case, the laptop computer would include display 112, keyboard 114, one or more auxiliary UIs 116, and controller 106 embodied as the computer's CPU. It is also contemplated that a computer or other equipment not normally capable of wireless communication may be adapted to connect to and effectively assume control of RF transceiver circuitry 108 and antenna 110 of a single-unit device such as one of those described above.

Mobile station 102 operates using a Subscriber Identity Module (SIM) 140 which is connected to or inserted in mobile station 102 at a SIM interface 142. SIM 140 is one type of a conventional "smart card" used to identify an end user (or subscriber) of mobile station 102 and to personalize the device, among other things. Without SIM 140, the wireless terminal is not fully operational for communication through wireless network 104. By inserting SIM 140 into the wireless terminal, an end user can have access to any and all of his/her subscribed services. In order to identify the subscriber, SIM 140 contains some user parameters such as an International Mobile Subscriber Identity (IMSI). In addition, SIM 140 is typically protected by a four-digit Personal Identification Number (PIN) which is stored therein and known only by the end user. An advantage of using SIM 140 is that end users are not necessarily bound by any single physical wireless device. Typically, the only element that personalizes a wireless terminal is a SIM card. Therefore, the user can access subscribed services using any wireless terminal equipped to operate with the user's SIM.

In general, SIM 140 includes a processor and memory for storing information. Information may be transferred between controller 106 and SIM 140 through data and control lines 144. SIM and its interfacing standards are well known. For interfacing with a standard GSM device having SIM interface 142, a conventional SIM 140 has six (6) connections. A typical SIM 140 may store the following information: (1) an International Mobile Subscriber Identity (IMSI); (2) an individual subscriber's authentication key (Ki); (3) a ciphering key generating algorithm (A8)—with Ki and RAND it generates a 64-bit key (Kc); (4) an authentication algorithm (A3)—with Ki and RAND it generates a 32-bit signed response (SRED); and (5) a user PIN code (1 & 2); and (6) a PUK code (1 & 2) (this is also referred to as the SPIN). SIM 140 may also store user-specific information as well, including a user phone book, Short Message Service (SMS) messages, datebook (or calendar) information, and recent call information.

SIM 140 also stores a list of MCC and MNC pairs associated with a plurality of communication networks which are part of the "home network". The list may be referred to as a Home Public Land Mobile Network (HPLMN) list. In addition, SIM 140 stores a list of MCC and MNC pairs associated with a plurality of "preferred" communication networks. This list may be referred to as a Preferred PLMN (PPLMN) list. Typically, networks identified in the PPLMN list are not associated with the home network and their use may impart "roaming" status to mobile station 102.

In FIG. 1, mobile station 102 communicates through wireless communication network 104. In the embodiment of FIG. 1, wireless network 104 is a Global Systems for Mobile (GSM) and General Packet Radio Service (GPRS) network. Wireless network 104 includes a base station 120 with an associated antenna tower 118, a Mobile Switching Center (MSC) 122, a Home Location Register (HLR) 132, a Serving General Packet Radio Service (GPRS) Support Node (SGSN) 126, and a Gateway GPRS Support Node (GGSN) 128. MSC 122 is coupled to base station 120 and to a landline network, such as a Public Switched Telephone Network (PSTN) 124. SGSN 126 is coupled to base station 120 and to GGSN 128, which is in turn coupled to a public or private data network 130 (such as the Internet). HLR 132 is coupled to MSC 122, SGSN 126, and GGSN 128.

Base station 120, including its associated controller and antenna tower 118, provides wireless network coverage for a particular coverage area commonly referred to as a "cell". Base station 120 transmits communication signals to and receives communication signals from mobile stations within its cell via antenna tower 118. Base station 120 normally performs such functions as modulation and possibly encoding and/or encryption of signals to be transmitted to the mobile station in accordance with particular, usually predetermined, communication protocols and parameters, under control of its controller. Base station 120 similarly demodulates and possibly decodes and decrypts, if necessary, any communication signals received from mobile station 102 within its cell. Communication protocols and parameters may vary between different networks. For example, one network may employ a different modulation scheme and operate at different frequencies than other networks.

The wireless link shown in communication system 100 of FIG. 1 represents one or more different channels, typically different radio frequency (RF) channels, and associated protocols used between wireless network 104 and mobile station 102. An RF channel is a limited resource that must be conserved, typically due to limits in overall bandwidth and a limited battery power of mobile station 102. Those skilled in art will appreciate that a wireless network in actual practice may include hundreds of cells, each served by a distinct base station 120 and transceiver, depending upon desired overall expanse of network coverage. All base station controllers and base stations may be connected by multiple switches and routers (not shown), controlled by multiple network controllers.

For all mobile station's 102 registered with a network operator, permanent data (such as mobile station 102 user's profile) as well as temporary data (such as mobile station's 102 current location) are stored in HLR 132. In case of a voice call to mobile station 102, HLR 132 is queried to determine the current location of mobile station 102. A Visitor Location Register (VLR) of MSC 122 is responsible for a group of location areas and stores the data of those mobile stations that are currently in its area of responsibility. This includes parts of the permanent mobile station data that have been transmitted from HLR 132 to the VLR for faster access. However, the VLR of MSC 122 may also assign and store local data, such as temporary identifications. Optionally, the VLR of MSC 122 can be enhanced for more efficient co-ordination of GPRS and non-GPRS services and functionality (e.g. paging for circuit-switched calls which can be performed more efficiently via SGSN 126, and combined GPRS and non-GPRS location updates).

Being part of the GPRS network, Serving GPRS Support Node (SGSN) 126 is at the same hierarchical level as MSC 122 and keeps track of the individual locations of mobile stations. SGSN 126 also performs security functions and access control. Gateway GPRS Support Node (GGSN) 128 provides interworking with external packet-switched networks and is connected with SGSNs (such as SGSN 126) via an IP-based GPRS backbone network. SGSN 126 performs authentication and cipher setting procedures based on the same algorithms, keys, and criteria as in existing GSM. In conventional operation, cell selection may be performed autonomously by mobile station 102 or by base station 120 instructing mobile station 102 to select a particular cell. Mobile station 102 informs wireless network 104 when it reselects another cell or group of cells, known as a routing area.

In order to access GPRS services, mobile station 102 first makes its presence known to wireless network 104 by performing what is known as a GPRS "attach". This operation establishes a logical link between mobile station 102 and SGSN 126 and makes mobile station 102 available to receive, for example, pages via SGSN, notifications of incoming GPRS data, or SMS messages over GPRS. In order to send and receive GPRS data, mobile station 102 assists in activating the packet data address that it wants to use. This operation makes mobile station 102 known to GGSN 128; interworking with external data networks can thereafter commence. User data may be transferred transparently between mobile station 102 and the external data networks using, for example, encapsulation and tunneling. Data packets are equipped with GPRS-specific protocol information and transferred between mobile station 102 and GGSN 128.

As apparent from the above, the wireless network includes fixed network components including RF transceivers, amplifiers, base station controllers, network servers, and servers connected to network. Those skilled in art will appreciate that a wireless network may be connected to other systems, possibly including other networks, not explicitly shown in FIG. 1. A network will normally be transmitting at very least some sort of paging and system information on an ongoing basis, even if there is no actual packet data exchanged. Although the network consists of many parts, these parts all work together to result in certain behaviors at the wireless link.

FIG. 2 is a detailed block diagram of a preferred mobile station 202 which may be utilized in system 100 of FIG. 1. Mobile station 202 is a two-way communication device having at least voice and data communication capabilities, including the capability to communicate with other computer systems. Depending on the functionality provided by mobile station 202, it may be referred to as a data messaging device, a two-way pager, a cellular telephone with data messaging capabilities, a wireless Internet appliance, or a data communication device (with or without telephony capabilities). Mobile station 202 includes a battery interface 254 for receiving one or more rechargeable batteries 256. Such a battery 256 provides electrical power to most if not all electrical circuitry in mobile station 202, and battery interface 254 provides for a mechanical and electrical connection for it. Battery interface 254 is coupled to a regulator (not shown in FIG. 2) which regulates power to all of the circuitry.

Mobile station 202 will normally incorporate a communication subsystem 211, which includes a receiver 212, a transmitter 214, and associated components, such as one or more (preferably embedded or internal) antenna elements 216 and 218, local oscillators (LOs) 213, and a processing module such as a digital signal processor (DSP) 220. Communication subsystem 211 is analogous to RF transceiver circuitry 108 and antenna 110 shown in FIG. 1. As will be apparent to those skilled in field of communications, particular design of communication subsystem 211 depends on the communication network in which mobile station 202 is intended to operate.

Network access requirements will also vary depending upon type of network utilized. In GPRS networks, for example, network access is associated with a subscriber or user of mobile station 202. A GPRS device therefore requires a Subscriber Identity Module, commonly referred to as a SIM card (i.e. SIM 262 of FIG. 2), in order to operate on the GPRS network. Without such a SIM 262, a GPRS device will not be fully functional. Local or non-network communication functions (if any) may be operable, but mobile station 202 will be unable to carry out any functions involving communications over the network. SIM 262 includes those features described in relation to FIG. 1 (i.e. those described for SIM 140 of FIG. 1), such as the HPLMN list and the PPLMN list.

Mobile station 202 may send and receive communication signals over the network after required network registration or activation procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Mobile station 202 includes a microprocessor 238 (which is one implementation of controller 106 of FIG. 1) which controls overall operation of mobile station 202. This control includes network selection and network name displaying techniques of the present application. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Data and control lines extend between a SIM interface 264 and microprocessor 238 for communicating data therebetween and for control. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile station 202. A predetermined set of applications which control basic device operations, including at least data and voice communication applications, will normally be installed on mobile station 202 during its manufacture. A preferred application that may be loaded onto mobile station 202 may be a personal information manager (PIM) application having the ability to organize and manage data items relating to user such as, but not limited to, e-mail, calendar events, voice mails, appointments, and task items. Naturally, one or more memory stores are available on mobile station 202 and SIM 256 to facilitate storage of PIM data items and other information.

The PIM application preferably has the ability to send and receive data items via the wireless network. In a preferred embodiment, PIM data items are seamlessly integrated, synchronized, and updated via the wireless network, with the mobile station user's corresponding data items stored and/or associated with a host computer system thereby creating a mirrored host computer on mobile station 202 with respect to such items. This is especially advantageous where the host computer system is the mobile station user's office computer system. Additional applications may also be loaded onto mobile station 202 through network, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile station 202 and may provide enhanced on-device functions, communication-related functions, or both. For example, secure communication applications may enable electronic commerce functions and other such financial transactions to be performed using mobile station 202.

In a data communication mode, a received signal such as a text message or web page download will be processed by communication subsystem 211 and input to microprocessor 238. Microprocessor 238 will preferably further process the signal for output to display 222 or alternatively to auxiliary I/O device 228. A user of mobile station 202 may also compose data items, such as e-mail messages or short message service (SMS) messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications, the overall operation of mobile station 202 is substantially similar, except that the received signals would be output to speaker 234 and signals for transmission would be generated by microphone 236. Alternative voice or audio I/O subsystems, such as a voice message recording subsystem, may also be implemented on mobile station 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile station 202 by providing for information or software downloads to mobile station 202 other than through a wireless communication network. The alternate download path may, for example, be used to load an encryption key onto mobile station 202 through a direct and thus reliable and trusted connection to thereby provide secure device communication.

Short-range communications subsystem 240 of FIG. 2 is an additional optional component which provides for communication between mobile station 202 and different systems or devices, which need not necessarily be similar devices. For example, subsystem 240 may include an infrared device and associated circuits and components, or a Bluetooth™ communication module to provide for communication with similarly-enabled systems and devices. Bluetooth™ is a registered trademark of Bluetooth SIG, Inc.

Figure 3:
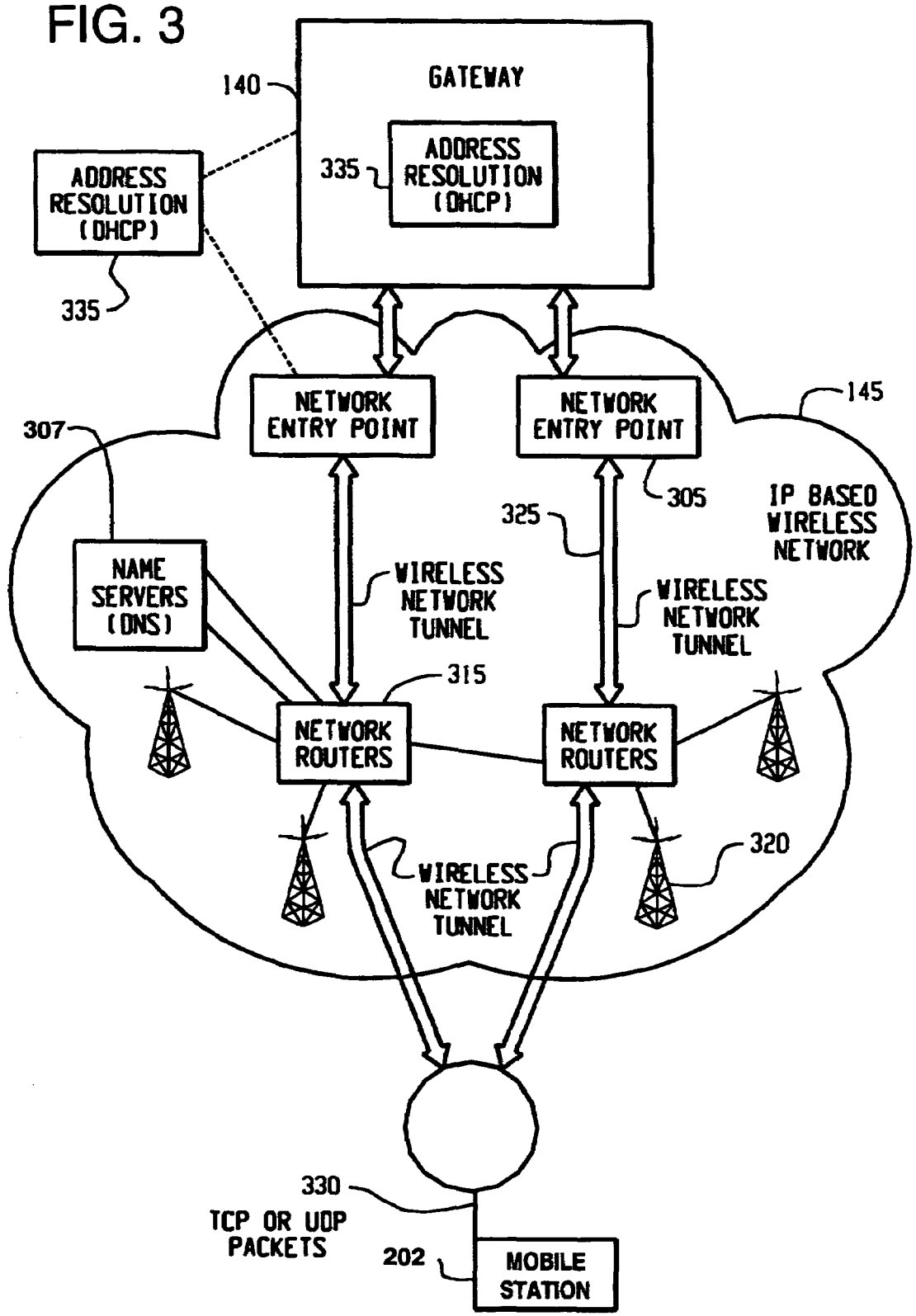
FIG. 3 is a particular structure of the system for communicating with the mobile station.

FIG. 3 shows a particular system structure for communicating with mobile station 202. In particular, FIG. 3 shows basic components of an IP-based wireless data network, such as a GPRS network. Mobile station 202 of FIG. 3 communicates with a wireless packet data network 145, and may also be capable of communicating with a wireless voice network (not shown). The voice network may be associated with IP-based wireless network 145 similar to, for example, GSM and GPRS networks, or alternatively may be a completely separate network. The GPRS IP-based data network is unique in that it is effectively an overlay on the GSM voice network. As such, GPRS components will either extend existing GSM components, such as base stations 320, or require additional components to be added, such as an advanced Gateway GPRS Service Node (GGSN) as a network entry point 305.

As shown in FIG. 3, a gateway 140 may be coupled to an internal or external address resolution component 335 and one or more network entry points 305. Data packets are transmitted from gateway 140, which is source of information to be transmitted to mobile station 202, through network 145 by setting up a wireless network tunnel 325 from gateway 140 to mobile station 202. In order to create this wireless tunnel 325, a unique network address is associated with mobile station 202. In an IP-based wireless network, however, network addresses are typically not permanently assigned to a particular mobile station 202 but instead are dynamically allocated on an as-needed basis. It is thus preferable for mobile station 202 to acquire a network address and for gateway 140 to determine this address so as to establish wireless tunnel 325.

Network entry point 305 is generally used to multiplex and demultiplex amongst many gateways, corporate servers, and bulk connections such as the Internet, for example. There are normally very few of these network entry points 305, since they are also intended to centralize externally available wireless network services. Network entry points 305 often use some form of an address resolution component 335 that assists in address assignment and lookup between gateways and mobile stations. In this example, address resolution component 335 is shown as a dynamic host configuration protocol (DHCP) as one method for providing an address resolution mechanism.

A central internal component of wireless data network 145 is a network router 315. Normally, network routers 315 are proprietary to the particular network, but they could alternatively be constructed from standard commercially available hardware. The purpose of network routers 315 is to centralize thousands of base stations 320 normally implemented in a relatively large network into a central location for a long-haul connection back to network entry point 305. In some networks there may be multiple tiers of network routers 315 and cases where there are master and slave network routers 315, but in all such cases the functions are similar. Often network router 315 will access a name server 307, in this case shown as a dynamic name server (DNS) 307 as used in the Internet, to look up destinations for routing data messages. Base stations 320, as described above, provide wireless links to mobile stations such as mobile station 202.

Wireless network tunnels such as a wireless tunnel 325 are opened across wireless network 345 in order to allocate necessary memory, routing, and address resources to deliver IP packets. In GPRS, such tunnels 325 are established as part of what are referred to as "PDP contexts" (i.e. data sessions). To open wireless tunnel 325, mobile station 202 must use a specific technique associated with wireless network 345. The step of opening such a wireless tunnel 325 may require mobile station 202 to indicate the domain, or network entry point 305 with which it wishes to open wireless tunnel 325. In this example, the tunnel first reaches network router 315 which uses name server 307 to determine which network entry point 305 matches the domain provided. Multiple wireless tunnels can be opened from one mobile station 202 for redundancy, or to access different gateways and services on the network. Once the domain name is found, the tunnel is then extended to network entry point 305 and necessary resources are allocated at each of the nodes along the way. Network entry point 305 then uses the address resolution (or DHCP 335) component to allocate an IP address for mobile station 202. When an IP address has been allocated to mobile station 202 and communicated to gateway 140, information can then be forwarded from gateway 140 to mobile station 202.

Wireless tunnel 325 typically has a limited life, depending on mobile station's 202 coverage profile and activity. Wireless network 145 will tear down wireless tunnel 325 after a certain period of inactivity or out-of-coverage period, in order to recapture resources held by this wireless tunnel 325 for other users. The main reason for this is to reclaim the IP address temporarily reserved for mobile station 202 when wireless tunnel 325 was first opened. Once the IP address is lost and wireless tunnel 325 is torn down, gateway 140 loses all ability to initiate IP data packets to mobile station 202, whether over Transmission Control Protocol (TCP) or over User Datagram Protocol (UDP).

In this application, an "IP-based wireless network" (one specific type of wireless communication network) may include but is not limited to: (1) a Code Division Multiple Access (CDMA) network that has been developed and operated by Qualcomm; (2) a General Packet Radio Service (GPRS) network for use in conjunction with Global System for Mobile Communications (GSM) network both developed by standards committee of European Conference of Postal and Telecommunications Administrations (CEPT); and (3) future third-generation (3G) networks like Enhanced Data rates for GSM Evolution (EDGE) and Universal Mobile Telecommunications System (UMTS). It is to be understood that although particular IP-based wireless networks have been described, the network selection schemes of the present application could be utilized in any similar type of wireless network. The infrastructure shown and described in relation to FIG. 3 may be representative of each one of a number of different networks which are provided and available in the same geographic region. One of these communication networks will be selected by the mobile station for communications at any given time.

Figure 4:
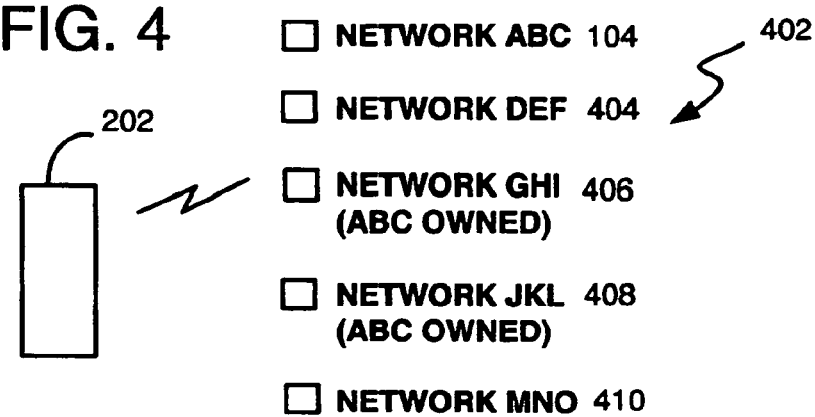
FIG. 4 is a simplified illustration of the mobile station and a plurality of wireless communication networks, each of which is associated with a unique Mobile Country Code (MCC) and Mobile Network Code (MNC) pair.

FIG. 4 is a simplified illustration a plurality of wireless communication networks 402 which may be available to mobile station 202 for communication. The plurality of networks 402 shown in FIG. 4 include different networks such as network "ABC" 104 (initially described in relation to FIGS. 1 and 3), a network "DEF" 404, a network "GHI" 406, a network "JKL" 408, and a network "MNO" 410. In the following description, network ABC 104 is the home communication network and may be referred to as "home network ABC" 104. Since home network ABC 104 is the home network, mobile station 202 prioritizes the selection and operation with home network ABC 104 over other networks. Each network 402 of FIG. 4 is associated with a unique Mobile Country Code (MCC) and Mobile Network Code (MNC) combination. The unique MCC/MNC combination corresponding to home network ABC 104 is stored as a home network.

Traditionally, mobile station's 202 use of networks other than the home network ABC 104 will impart a "roaming" status to mobile station 202. However, some additional networks other than home network ABC 104 are associated with or designated as part of the "home network" as well. In FIG. 4, for example, it is indicated that network GHI 406 and network JKL 408 are owned by the service provider of home network ABC 104. Thus, mobile station's 202 registration and operation with networks GHI 406 and JKL 408 will not impart the roaming status to mobile station 102, even though networks GHI 406 and JKL 408 have MCC and MNC pairs different from that of home network ABC 104. Thus, the unique MCC/MNC combinations corresponding to networks GHI 406 and JKL 408 are also stored as home networks. The remaining networks, namely, networks DEF 404 and MNO 410, are not associated with the home network and their use will indeed impart roaming status to mobile station 102.

Figure 6:
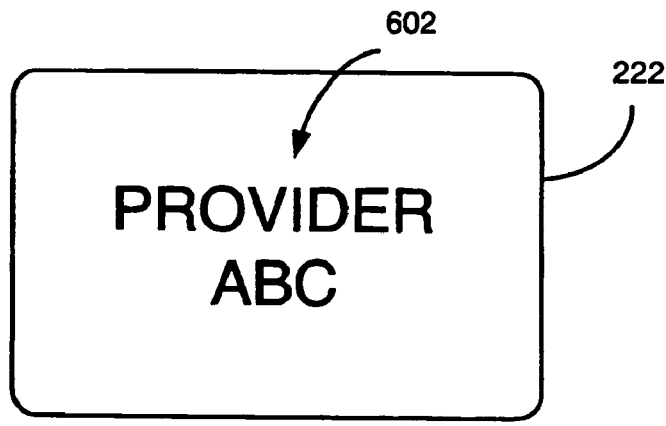
FIG. 6 is an illustration of a visual display of the mobile station which may visually display a network or service provider name with which the mobile station has registered.

Referring now to FIG. 6 in combination with FIG. 4, display 222 of the mobile station will visually display the same service provider name 602 of home network ABC 104 regardless of whether network ABC 104, network GHI 406, or network JKL 408 is selected by the mobile station. As shown in FIG. 6, the displayed name "PROVIDER ABC" may correspond to use of network ABC 104, network GHI 406 (which is owned by ABC), or network JKL 408 (which is also owned by ABC). Note that no "roaming" status indicator is enabled or activated in display 222, since the mobile station is not roaming when registered with network ABC 104, network GHI 406, or network JKL 408. A network name different from "PROVIDER ABC" will be displayed when networks DEF 404 and MNO 410 are utilized.

Figure 5:
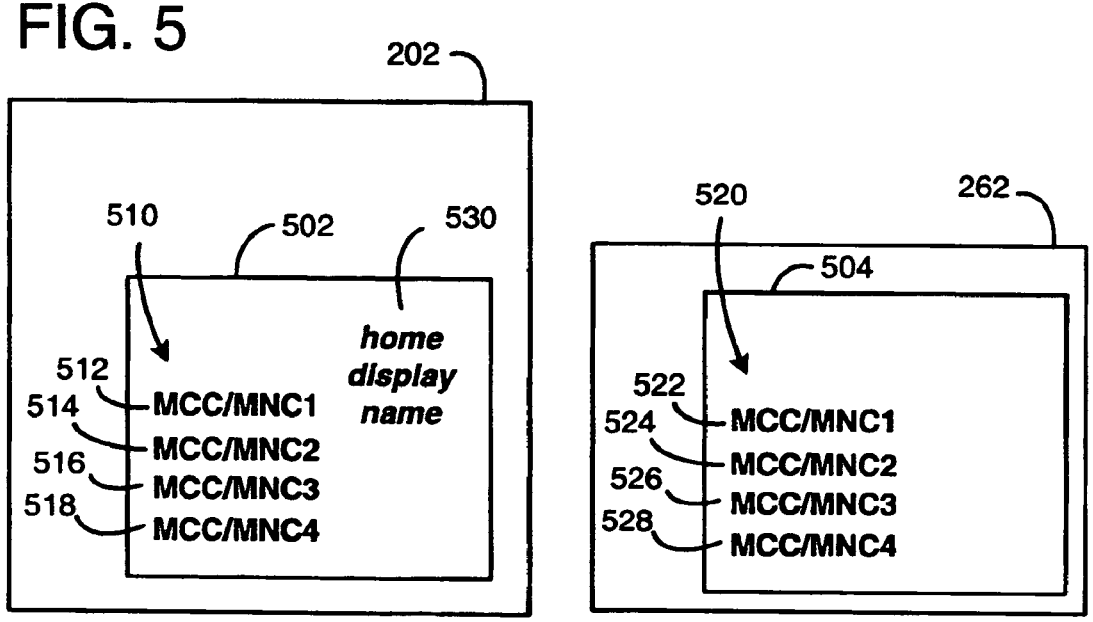
FIG. 5 shows a list of home network MCC and MNC pairs stored in association with a home network display name from a home network name file.

Referring now to FIG. 5, what is shown is relevant information stored in memory 502 of mobile station 202 and/or in memory 504 of SIM 262 to help achieve the advantages described above in relation to FIGS. 4 and 6. The discussion of FIG. 5 will begin with a description related to memory 502 of mobile station 202. Memory 502, which may be a permanently-installed memory of mobile station 202, such as a Read-Only Memory (ROM), an Electrically Erasable/Programmable ROM (EEPROM), flash memory, etc., is a separate memory component from memory 504 of SIM 262.

As shown in FIG. 5, memory 502 may store a list 510 of home network MCC/MNC pairs which are associated with a home network display name 530. This list 510 of home network MCC/MNC pairs are prestored in memory 502 in a (semi-) permanent fashion during the manufacturing process of mobile station 202. In FIG. 5, it is shown that the example list 510 includes four (4) home network MCC/MNC pairs, namely, home network MCC/MNC pairs 512, 514, 516, and 518. Only a relatively small number of MCC/MNC pairs in list 510 are shown for illustrative clarity; any suitable number of pairs may be utilized, such as between 5-50 pairs. As an example, MCC/MNC pair 512 may correspond to home network ABC 104 of FIG. 4, MCC/MNC pair 514 may correspond to network GHI 406 of FIG. 4, MCC/MNC pair 516 may correspond to network JKL 408 of FIG. 4, and MCC/MNC pair 518 may correspond to another home network not shown. Home network display name 530 (e.g. "T-Mobile" or "AT&T Wireless"), the name string used for mobile station's display for all home-related networks, is associated and used with all of MCC/MNC pairs in list 510.

In general, mobile station 202 operates to preferentially select and register with home networks over non-home networks. If no home network is available, mobile station 202 operates to preferentially select and register with one of the networks its PPLMN list. In any case, after mobile station 202 selects and registers with a communication network, it first consults with list 510 of MCC/MNC pairs to assist in determining what network name should be displayed in its visual display. Specifically, mobile station 202 compares the MCC/MNC pair of the selected network with the MCC/MNC pairs in list 510. If mobile station 202 identifies a match between the MCC/MNC pair and any one of the MCC/MNC pairs in list 510, it reads and causes the home network display name 530 to be displayed in its visual display. Otherwise, it selects an alternate network name for visual display. Advantageously, a single home network name is displayed when any of the networks associated with the home network MCC and MNC pairs in list 510 is selected for communication. Preferably, although the technique described focuses on the use of only an MCC and MNC pair, the technique may include the use of a Location Area Code (LAC) in addition to the MCC and MNC (i.e. the tuplet MCC/MNC/LAC is used to identify the home network display name).

In an alternative embodiment, the SIM 262 utilized with mobile station 202 may include the same or similar information. As shown in FIG. 5, memory 504 of SIM 262 may alternatively store a list 520 of home network MCC/MNC pairs in association with home network display name 530. This list 520 of home network MCC/MNC pairs are pre-stored in memory 504 in a (semi-) permanent fashion during the initial programming of SIM 262. In FIG. 5, it is shown that the example list 520 includes four (4) home network MCC/MNC pairs, namely, home network MCC/MNC pairs 522, 524, 526, and 528. Only a relatively small number of MCC/MNC pairs in list 520 are shown for illustrative clarity; any suitable number of pairs may be utilized, such as between 5-50. As an example, MCC/MNC pair 522 may correspond to home network ABC 104 of FIG. 4, MCC/MNC pair 524 may correspond to network GHI 406 of FIG. 4, MCC/MNC pair 526 may correspond to network JKL 408 of FIG. 4, and MCC/MNC pair 528 may correspond to another home network not shown. Home network display name 530 (e.g. "T-Mobile" or "AT&T Wireless"), the name string used for mobile station's display for all home-related networks, is associated and used with all of MCC/MNC pairs in list 520. In this alternative example, mobile station 202 operates in the same manner in relation to the information in memory 504 of SIM 262 as was described above in relation to the information in memory 502 of mobile station 202. Preferably, although this technique describes focuses on the use of only an MCC and MNC pair, the technique may include the use of a Location Area Code (LAC) in addition to the MCC and MNC (i.e. it uses this tuplet to identify the home network display name).

FIG. 7 is a flowchart for describing a home network name displaying method for multiple home networks. Such a method may be employed in connection with components shown and described above in relation to FIGS. 1-6. Beginning with a start block 702, a mobile station scans to receive a plurality of Mobile Country Code (MCC) and Mobile Network Code (MNC) pairs which correspond to a plurality of wireless communication networks within a given coverage area (step 704). Next, the mobile station compares a received MCC/MNC pair with multiple MCC/MNC pairs associated with a home communication network (step 706). These multiple MCC/MNC pairs may be stored in a Home Public Land Mobile Network (HPLMN) list on a Subscriber Identity Module (SIM). Alternatively, the multiple MCC/MNC pairs may be stored in memory of the mobile station. If there is a match at step 708 with one of the MCC/MNC pairs, the mobile station selects this "home" network which is associated with the MCC/MNC pair for communication (step 712). Otherwise, if there is no match, the mobile station selects a preferred network or other non-home network for communication (step 710). In any case, the mobile station tunes to the appropriate channel and initiates registration onto the network associated with the selected MCC/MNC pair (step 714).

Next, the mobile station compares the received MCC and MNC pair associated with the selected network with each one of the multiple home network MCC/MNC pairs (step 716). Based on a match at step 718, the mobile station reads and causes a home network name associated with the home network MCC/MNC pairs to be displayed in its visual display (step 722). Thus, the same network name will be displayed for any MCC and MNC pair found in the home network list. If there is no match in the list at step 718 (i.e. no match), however, then the mobile station visually displays an alternate non-home network name in the visual display (step 720). Preferably, although the method of FIG. 7 focuses on the use of only an MCC and MNC pair, the method may include the use of a Location Area Code (LAC) in addition to the MCC and MNC (i.e. a tuplet MCC/MNC/LAC is used for selection).

In a slight variation of the method of FIG. 7, the mobile station utilizes a multiple home network list on the SIM if it is stored on the SIM but, if such a list is not stored on the SIM the mobile station utilizes a multiple home network list stored in its own memory. The mobile station may identify or detect whether there is a multiple home network list on the SIM by testing if a predetermined designated area of memory on the SIM includes this list or associated data. Alternatively, the mobile station may perform this identification by-testing if a version number of the SIM corresponds to having such a multiple home network list (e.g. a less recent version number of SIM may not specify such list whereas a more recent predetermined version number may do so). This test may be performed every time the mobile station goes through the network name displaying technique or, alternatively, only once during or shortly after a SIM initialization procedure performed by the mobile station.

Advantageously, issues arising from a service provider becoming the new owner of one or more networks which have MCC/MNC pairs different from that of the home network's are alleviated. All home network MCC/MNC pairs are appropriately stored in memory of the mobile station or SIM which is updated when new networks are added to the home network. Visually displaying the (same) service provider name for these networks is suitably performed based on the present techniques. In one implementation, compatibility is provided between previous, current, and future versions mobile stations and SIMs by providing a test to identify the availability of such a list on the SIM and a similar backup list on the mobile station.

Final Comments. Home network name displaying methods and apparatus for multiple home networks are described herein. A mobile station scans to receive a plurality of Mobile Country Code (MCC) and Mobile Network Code (MNC) pairs corresponding to a plurality of communication networks within a coverage area. The mobile station selects and registers with a communication network associated with one of the received MCC and MNC pairs for communication. After the network is selected, the received MCC and MNC pair is compared with a plurality of home network MCC and MNC pairs which are associated with a single home network display name. Based on identifying a match between the received MCC and MNC pair and any one of the home network MCC and MNC pairs, the home network display name is visually displayed in a display of the mobile station. If no match exists, an alternate name is selected for display. The plurality of home network MCC and MNC pairs may be stored in memory of the mobile station or, alternatively, on a Subscriber Identify Module (SM). Advantageously, a single home network name is displayed when a network associated with any of the home network MCC and MNC pairs is selected for communication.

A computer program product of the present application includes a computer storage medium as well as computer instructions stored on the computer storage medium. The computer storage medium may be any memory in mobile station 202 or even a floppy disk or CD-ROM, as examples; detailed computer instructions are written in accordance with the methods and logic described in the present application. Specifically, the computer instructions are executable by a processor (e.g. a microprocessor) to perform the steps of scanning to receive a plurality of Mobile Country Code (MCC) and Mobile Network Code (MNC) pairs corresponding to a plurality of wireless communication networks within a coverage area; scanning to receive a plurality of Mobile Country Code (MCC) and Mobile Network Code (MNC) pairs corresponding to a plurality of wireless communication networks within a coverage area; selecting and registering with a wireless communication network associated with one of the received MCC and MNC pairs; comparing the MCC and MNC pair of the selected network with a plurality of home network MCC and MNC pairs; and causing a home network display name to be visually displayed in a visual display of the mobile station based on identifying a match between the MCC and MNC pair of the selected network and one of the home network MCC and MNC pairs.

A mobile station of the present application includes a transceiver which is operative to scan to receive a plurality of Mobile Country Code (MCC) and Mobile Network Code (MNC) pairs corresponding to a plurality of wireless communication networks within a coverage area; memory which stores a plurality of home network MCC and MNC pairs which are associated with a home network display name; and a processor which is operative select and register with a wireless communication network associated with one of the received MCC and MNC pairs; compare the MCC and MNC pair of the selected network with the plurality of home network MCC and MNC pairs; and cause the home network display name to be visually displayed in a visual display of the mobile station based on identifying a match between the MCC and MNC pair of the selected network and one of the home network MCC and MNC pairs.

The above-described embodiments of invention are intended to be examples only. Alterations, modifications, and variations may be effected to particular embodiments by those of skill in art without departing from scope of invention, which is defined solely by claims appended hereto.

What is claimed is:

1. A network name displaying method in a mobile station, the method comprising:
scanning to receive a plurality of Mobile Country Code (MCC) and Mobile Network Code (MNC) pairs corresponding to a plurality of wireless communication networks within a coverage area;
selecting and registering with a wireless communication network associated with one of the received MCC and MNC pairs, giving a preference to home networks of a Home Public Land Mobile Network (HPLMN) list over non-home networks of a Preferred PLMN (PPLMN) list;
comparing the MCC and MNC pair of the selected network with a plurality of home network MCC and MNC pairs corresponding to the home networks of the HPLMN list;
for the step of comparing: using a plurality of home network MCC and MNC pairs from the HPLMN list stored on a Subscriber Identify Module (SIM) in the comparing step based on identifying that the plurality of home network MCC and MNC pairs are stored on the SIM, and otherwise using a plurality of home network MCC and MNC pairs stored in memory of the mobile station in the comparing step;
causing a home network display name which is the same for all of the home network MCC and MNC pairs to be visually displayed in a visual display of the mobile station based on identifying a match between the MCC and MNC pair of the selected network and one of the home network MCC and MNC pairs; and
otherwise causing an alternate display name to be visually displayed in the visual display based on identifying no match between the MCC and MNC pair of the selected network and the home network MCC and MNC pairs.

2. The method of claim 1, wherein the plurality of home network MCC and MNC pairs are stored in the SIM.

3. The method of claim 1, wherein the plurality of home network MCC and MNC pairs are stored in the memory of the mobile station.

4. The method of claim 1, wherein a Location Area Code (LAC) is used in addition to the MCC and the MNC in the acts of comparing and identifying.

5. The method of claim 1, wherein the step of identifying that the plurality of home network MCC and MNC pairs are stored on the SIM comprises the further step of testing a predetermined designated area of memory on the SIM.

6. A mobile station, comprising:
a transceiver being operative to scan to receive a plurality of Mobile Country Code (MCC) and Mobile Network Code (MNC) pairs corresponding to a plurality of wireless communication networks within a coverage area;
a Subscriber Identity Module (SIM) interface for receiving a SIM;
a processor being operative to:
select and register with a wireless communication network associated with one of the received MCC and MNC pairs, giving a preference to home networks of a Home Public Land Mobile Network (HPLMN) list over non-home networks of Preferred PLMN (PPLMN) list;
compare the MCC and MNC pair of the selected network with a plurality of home network NICC and MNC pairs corresponding to the home networks of the HPLMN list and associated with a home network display name;
for the comparison: using a plurality of home network MCC and MNC pairs from the HPLMN list stored on the SIM for the comparison based on identifying that the plurality of home network MCC and MNC pairs are stored on the SIM, and otherwise using a plurality of home network MCC and MNC pairs stored in memory of the mobile station for the comparison;
cause the home network display name which is the same for all of the home network MCC and MNC pairs to be visually displayed in a visual of the mobile station based on identifying a match between the MCC and MNC pair of the selected network and one of the home network MCC and MNC pairs; and otherwise cause an alternate display name to be visually displayed in the visual display based on identifying no match between the MCC and MNC pair of the selected network and the home network MCC and MNC pairs.

7. The mobile station of claim 6, wherein the plurality of home network MCC and MNC pairs are stored on the SIM.

8. The mobile station of claim 6, wherein the memory is separate and apart from the SIM in the mobile station.

9. The mobile station of claim 6, wherein a Location Area Code (LAC) is used in addition to the MCC and the MNC in the acts of comparing and identifying.

10. The mobile station of claim 6, wherein the processor is further operative to:

identify that the plurality of home network MCC and MNC pairs are stored on the SIM by testing a predetermined designated area of memory on the SIM.

11. A computer program product, comprising:

a computer storage medium;

computer instructions stored on the computer storage medium;

the computer instructions being executable by a processor for executing the steps of:

causing a scanning process to receive a plurality of Mobile Country Code (MCC) and Mobile Network Code (MNC) pairs corresponding to a plurality of wireless communication networks within a coverage area;

selecting and registering with a wireless communication network associated with one of the received MCC and MNC pairs, giving a preference to home networks of a Home Public Land Mobile Network (HPLMN) list over non-home networks of a Preferred PLMN (PLMN) list;

comparing the MCC and MNC pair of the selected network with a plurality of home network MCC and MNC pairs corresponding to the home networks in the HPLMN and associated with a home network display name;

for the comparing: using a plurality of home network MCC and MNC pairs from the HPLMN list stored on a Subscriber Identify Module (SIM) for the comparing based on identifying that the plurality of home network MCC and MNC pairs are stored on the SIM, and otherwise using a plurality of home network MCC and MNC pairs stored in memory of the mobile station for the comparing;

causing the home network display name which is the same for all home network MCC and MNC pairs to be visually displayed in a visual display of the mobile station based on identifying a match between the MCC am MNC pair of the selected network and one of the home network MCC and MNC pairs; and otherwise causing an alternate display name to be visually displayed in the visual display based on identifying no match between the MCC and MNC pair of the selected network and the home network MCC and MNC pairs.

12. The computer program product of claim 11, wherein the plurality of home network MCC and MNC pairs are stored in the SIM.

13. The computer program product of claim 11, wherein the plurality of home network MCC and MNC pairs are stored in the memory of the mobile station.

14. The computer program product of claim 11, wherein a Location Area Code (LAC) is used In addition to the MCC and the MNC in the acts of comparing and identifying.

15. The computer program product of claim 11, wherein the computer instructions are further executable for identifying that the plurality of home network MCC and MNC pairs are stored on the SIM by testing a predetermined designated area of memory on the SIM.

16. The computer program product of claim 11, wherein the computer instructions are further executable for identifying that the plurality of home network MCC and MNC pairs are stored on the SIM by testing a version number of the SIM.

17. The method of claim 1, wherein the step of identifying that the plurality of home network MCC and MNC pairs are stored on the SIM comprises the further step of testing a version number of the SIM.

18. The mobile station of claim 6 wherein, to identify that the plurality of home network MCC and MNC pairs are stored on the SIM, the processor is further operative to test a version number of the SIM.

19. A network name displaying method in a mobile station, the method comprising:

scanning to receive a plurality of Mobile Country Code (MCC) and Mobile Network Code (MNC) pairs corresponding to a plurality of wireless communication networks within coverage area;

selecting and registering with a wireless communication network associated with one of the received MCC and MNC pairs, giving a preference to home networks of a Home Public Land Mobile Network (HPLMN) list over non-home networks of a Preferred PLMN (PPLMN) list;

causing a home network display name which is the same for all of the home network MCC and MNC pairs to be visually display in a visual display of the mobile station based on identifying a match between the MCC and MNC pair of the selected network, and one of the home network MCC and MNC pairs; and otherwise causing an alternate display name to he visually displayed in the visual display based on identifying no match between the MCC and MNC pair of the selected network and the home network MCC and MNC pairs.

* * * * *

UNITED STATES PATENT AND TRADEMARK OFFICE
CERTIFICATE OF CORRECTION

| | | |
|---|---|---|
| PATENT NO. | : 7,274,933 B2 | Page 1 of 1 |
| APPLICATION NO. | : 10/932899 | |
| DATED | : September 25, 2007 | |
| INVENTOR(S) | : Zinn et al. | |

It is certified that error appears in the above-identified patent and that said Letters Patent is hereby corrected as shown below:

In column 18, line 48, change "visually display" to --visually displayed--.

Signed and Sealed this
Eighteenth Day of December, 2012

David J. Kappos
*Director of the United States Patent and Trademark Office*